July 1, 1969 — H. WEH — 3,453,459
ELECTRIC GENERATORS
Filed Feb. 3, 1966

Inventor:
Herbert Weh
By: Spencer & Kaye
Attorneys

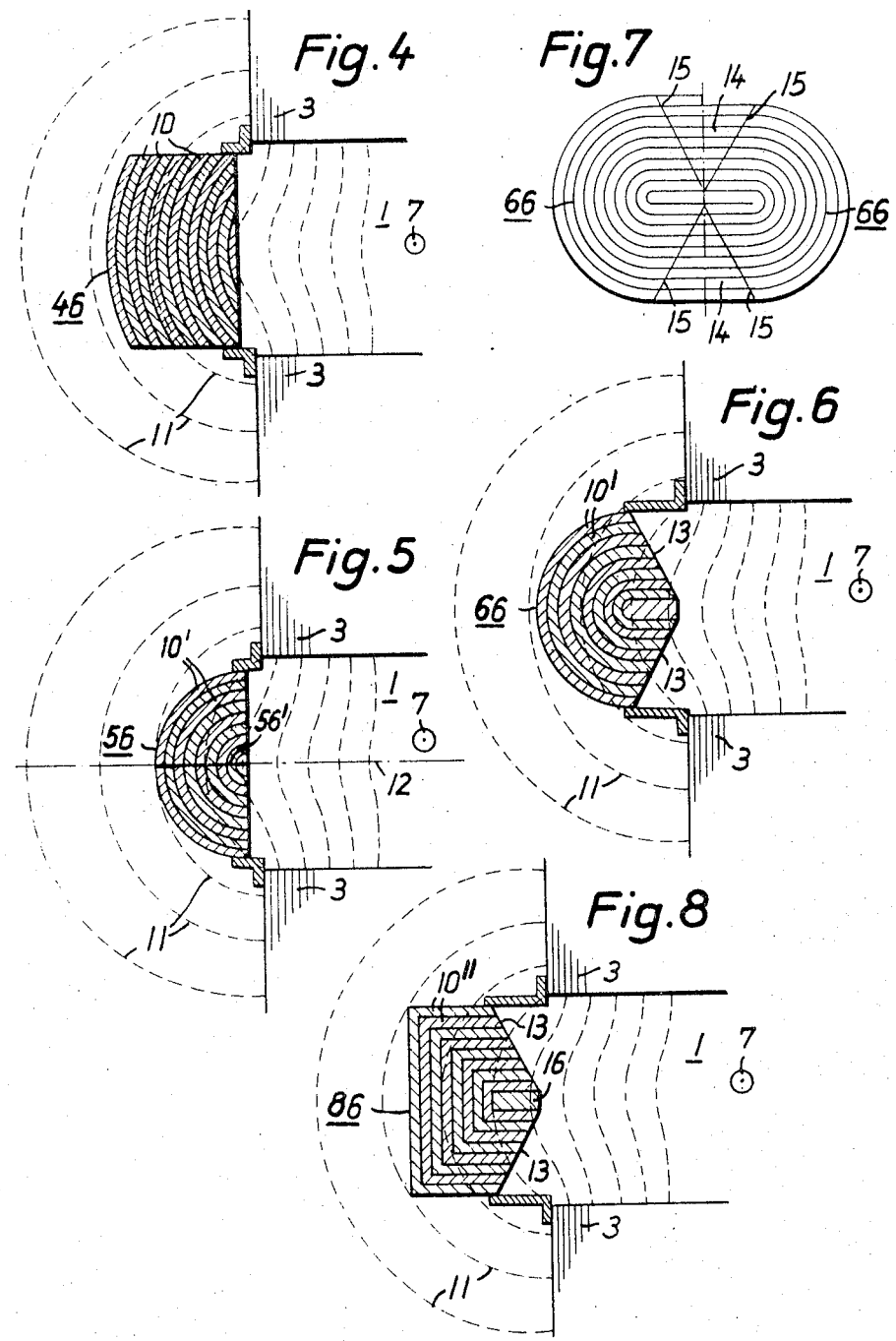

> United States Patent Office 3,453,459
Patented July 1, 1969

3,453,459
ELECTRIC GENERATORS
Herbert Weh, 4 Brahmstrasse, 33 Braunschweig, Germany
Filed Feb. 3, 1966, Ser. No. 524,767
Claims priority, application Germany, Feb. 3, 1965,
W 38,464
Int. Cl. G21d 7/02; H02k 45/00
U.S. Cl. 310—11                                16 Claims

ABSTRACT OF THE DISCLOSURE

A side conductor disposed between the two opposing stator members of a MHD or MGD generator and composed of a plurality of laminations which are electrically insulated from one another and which extend in the direction of the generator flow channel to serve as short-circuit return paths for the electric current induced in the conductive medium flowing through the channel, the laminations also extending between the stator members so as to lie substantially along the flux lines extending between the stator portions. The laminations are preferably formed so that the lateral edges of each are in electrical contact with the conductive fluid in the flow channel.

---

The present invention relates to the field of electric generators, and particularly to generators which directly convert the kinetic energy of a flowing medium into electrical energy.

Devices of this type are generally known as magneto-hydro-dynamic, or MHD, generators and magneto-gas-dynamic, or MGD, generators and act to directly convert the kinetic energy of a flowing medium into electrical energy by the interaction of magnetic fields with the electrically conductive flowing medium. This medium can be a gas, a gas mixture, or a liquid.

According to a first form of construction, MGD generators are arranged with a stationary excitation field and are provided with a channel through which hot, electrically conductive gas, at a temperature of 3000° C., or more, flows at a high velocity. This channel is traversed by a magnetic field which induces an electric field at right angles both to itself and to the direction of flow of the conductive gas. Such devices must be provided with an electrode arrangement for drawing off electrical current from the conductive zones of the gaseous stream.

According to another form of construction, MHD machines are provided with travelling fields and do not require any output electrodes because, when the arrangement operates as an electric generator, the generated electrical power is produced by currents induced in the stator winding. In addition, these latter devices are provided with side conductors which act as an electrical return path for the currents induced in the flowing medium. Thus, in operation, the machine acts as a synchronous device operating in a supersynchronous manner with the side conductors acting as the rotor conductors and the flow of the medium corresponding to rotor rotation. It has been found that side conductors can also be used in MGD generators.

It has also been found that, insofar as concerns the technological applicability and utility of MHD generators, the electrical conductivity of the flowing medium plays a more important role in travelling field devices than it does in stationary field devices. In travelling field MHD generators, the electrical conductivity of the flowing medium, together with other design parameters, determines the maximum efficiency and power factor which can be obtained. In machines of this type, the flowing medium is usually a liquid metal which, if it is constituted by a properly selected material, will have a higher conductivity, even at low temperatures, than a gas.

It is a primary object of the present invention to improve the operation of such devices.

It is a more specific object of the present invention to improve the current flow characteristics of such devices.

Another object of the present invention is to provide improved side conductors for traveling field generators of this type.

Another object herein is to provide a simplified method for constructing symmetrical side conductors for such devices.

The advantages of the present invention are primarily achieved by utilizing a novel form of side conductor in a MGD or MHD generator having a flow channel for the flow of a conductive field medium and at least one laminated stator provided with a stator winding. The side conductor according to the present invention, which provides a return path for electric current flowing through the fluid medium transversely to the direction of fluid flow, is formed of a plurality of individual laminations which constitute sub-conductors and which are electrically insulated from one another.

According to a particular feature of the present invention, these laminations are formed to extend substantially along the flux lines of the magnetic field produced by the stator winding in the region where the field extends through the side conductor.

The present invention also involves a method of manufacturing side conductors of the type described above by winding a foil of conductive material for forming a coil whose individual turns define sub-conductors of the side conductors, the foil having preferably been previously provided with an insulating layer.

Additional objects and advantages of the present invention will become apparent upon consideration of the following description when taken in conjunction with the accompanying drawings in which:

FIGURE 4 is a view similar to that of FIGURE 3 showing a first embodiment of the present invention.

FIGURE 5 is a view similar to that of FIGURE 3 showing another embodiment of the present invention.

FIGURE 6 is a view similar to that of FIGURE 3 showing yet another embodiment of the present invention.

FIGURE 7 is an end view showing a preferred form of construction of the embodiment shown in FIGURE 6.

FIGURE 8 is a view similar to that of FIGURE 3 showing a still further embodiment of the present invention.

Figure 1:
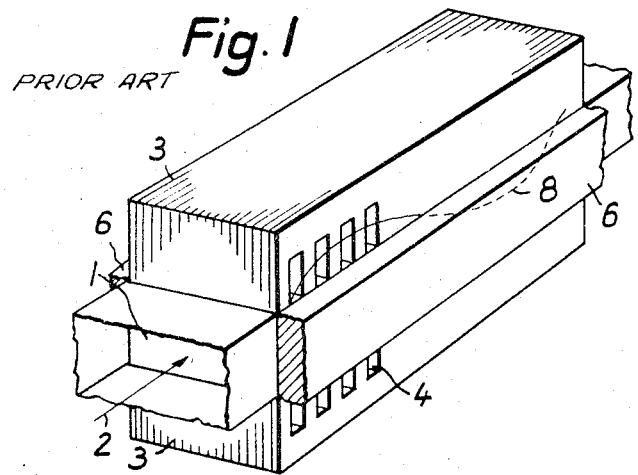
FIGURE 1 is a perspective view of a device of the type with which the present invention is intended to be used.
Figure 2:
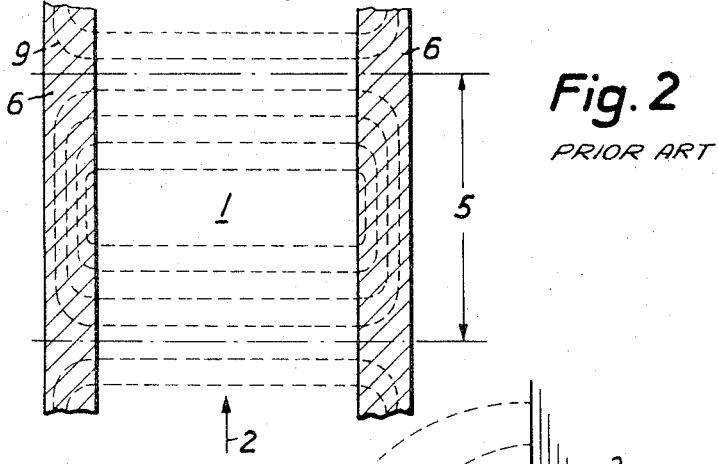
FIGURE 2 is a partial, cross-sectional plan view taken through the flow channel of the device of FIGURE 1.
Figure 3:
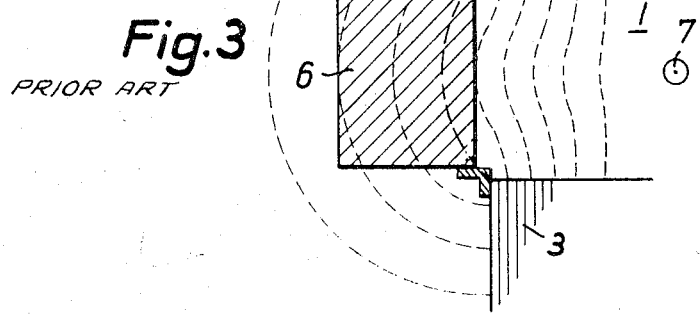
FIGURE 3 is a cross-sectional detail view of the arrangement of FIGURE 1 taken along a plane perpendicular to the direction of fluid flow in the device of FIGURE 1.

Referring first to FIGURES 1 to 3, there is shown a travelling field device provided with a channel 1 through which the medium flows in the direction of the arrow 2. The walls of the flow channel include upper and lower walls 3 each constituted by a stack of stator laminations and each provided with a plurality of transverse grooves 4 for receiving a stator winding (not shown). If an alternating voltage, preferably a three-phase voltage, is applied to this winding, a magnetic field would be produced (see FIGURE 3). The other walls of channel 1 are defined by two side conductors 6 which will be described in greater detail below. FIGURE 2 is a cross-sectional plan view of the channel 1 taken parallel to the wall faces defined by members 3. The broken-line loops 9 represent the paths followed by induced currents in the flowing medium and in the side conductors 6. FIGURE 3 is a cross-sectional view of a portion of the arrangement of FIGURE 1 taken along a plane perpendicular to that of FIGURE 2, the flow direction of the medium being indicated by the arrow head 7. The broken-lines in FIGURE 3 represent the flux lines of the magnetic field produced by the stator.

It may be readily appreciated that the magnetic field produced by the windings in stator 3 has a sinusoidal spatial variation, as indicated by the line 8 of FIGURE 1, and that the length of one cycle of this variation is determined by the pole pitch 5.

When the fluid medium is driven through the channel 1 at a speed which is lower than that of the travelling magnetic field, a motor or pump action will be produced, while if the medium is driven at a speed greater than that of the magnetic field, a generator action will result.

The efficiency of the energy conversion of such a machine can be improved if the currents induced in the flowing medium, which currents extend essentially transversely to the direction of flow of the medium, encounter a return path having as low a resistance as possible, which return path can be constituted by one or more stationary or moving members extending in the direction of flow of the medium.

Members of this type are shown in FIGURES 1 to 3 as being constituted by the side conductors 6 which are preferably arranged so as to be close as possible to the outer edges of laminated members 3. The larger the cross section of the members 6 and the higher the conductivity of the material constituting these members, the smaller will be their resistance, assuming that the current is distributed evenly throughout the entire cross section of each member. In this respect, the side conductors 6 correspond to the short-circuit ring of the squirrel cage winding of a standard asynchronous machine.

It has been found that the possibility of reducing the resistance of such members by giving them as large a cross-sectional area as possible is limited by the uneven current distribution (eddy current effects) which tends to occur in these members. This effect may be best understood by referring to FIGURE 3 wherein the broken-lines represent the flux lines of the magnetic field created between the two stator members 3 by the current passing through the windings disposed therein. As may be seen, a portion of this magnetic field traverses the side conductors 6 and thus induces electric fields which create the eddy currents. These eddy currents are superimposed on the return currents (see FIGURE 2) conveyed from the fluid medium. Because of the eddy currents created by the electric fields induced in the side conductors, an uneven current distribution is created in the side conductors 6 and hence their effective resistance is increased. Moreover, this creates an undesirable added loss in the side conductors 6, the additional eddy current loss being proportional to the square of the product of the thickness of the conductor, the frequency of the induced current, and the maximum amplitude of the magnetic flux traversing the conductor.

It is possible to reduce these eddy current losses by disposing the side conductors as far away from the stator members 3 as possible so that these conductors will be in a relatively low magnetic field region. This arrangement has serious limitations, however, because such a disposition of these side conductors would substantially reduce their ability to act as effective return paths for the current loops 9 and would thus have a markedly adverse effect on the operating efficiency of the device.

The above-described relationship between eddy current losses and the thickness of the conductor has been found to indicate that the thickness of the conductor should only be increased to a point where the sum of the return current losses and the eddy current losses are at a minimum because an increase in the thickness beyond this critical value will cause an increase in the total losses.

The present invention seeks to permit a further reduction to be achieved in the losses occurring in the side conductors by constructing these conductors of a plurality of individual laminations which are electrically insulated from each other to form a plurality of individual sub-conductors. According to a particular feature of the present invention, these laminations are so formed as to extend along the paths followed by the magnetic flux lines passing between the stator members 3 in the regions occupied by the side conductors.

FIGURE 4 shows a first form of construction of a side conductor according to the present invention. As is shown therein, the one-piece conductor 6 of FIGURE 3 is replaced by a conductor 46 disposed between the two stator members 3 and to one side thereof, this side conductor 46 being constituted by a plurality of laminations 10 which are electrically insulated from each other and which constitute a plurality of sub-conductors. The laminations 10 may be made of any suitable conductive material such as copper. As may be seen, these laminations are shaped to generally follow the flux lines 11 of the magnetic field between the stator members 3. Although the configuration given the laminations 10 of FIGURE 4 is highly advantageous from the point of view of reducing the amplitudes of the resulting eddy currents, this configuration does have the drawback of preventing each sub-conductor from making electrical contact with the fluid medium flowing through the channel 1 and hence prevents the outermost sub-conductors from constituting effective current return paths.

The above-noted drawback is substantially eliminated by the form of construction shown in FIGURE 5 wherein the side conductor 56 is constituted by a plurality of substantially semicircular laminations 10' each of which has its edges conductively contacting a portion of the fluid medium in channel 1. Of course, the arrangement shown in FIGURE 5 is such that the individual laminations no longer extend precisely along the paths followed by the flux passing between the stator members 3. However, this deviation only produces a slight increase in the eddy current losses occurring in the side conductor.

At this point it should be noted that the center line 12 of the flow channel 1 and the side conductor 6 represents the plane of symmetry for the flow of currents, both in the flow channel 1 and in the side conductor 6. If the structure of the entire device is formed so as to be symmetrical with respect to this plane, no current will flow across the plane. Therefore, the individual laminations 10 can be divided into two parts along this plane and separated by an insulating layer 56', as may be desirable for various structural and construction reasons.

Referring now to FIGURE 6, there is shown another embodiment for the side conductor according to the present invention wherein the total cross-sectional area available for the return currents is increased. This is accomplished by bevelling the inner surfaces 13 of the conductor 66 so as to give all of the sub-conductors 10' substantially the same length and hence the same direct current resistance.

In accordance with another feature of the present invention, side conductors having the form of the member 66 of FIGURE 6 can be constructed, as is shown in FIGURE 7, by winding an insulated copper foil having the proper thickness into a coil and by gluing the adjacent layers together. The bevelled surfaces 13 can then be produced by cutting out triangular parts 14 along the lines 15 in order to produce two identical side conductors 66 each of which can be arranged on a respective side of the flow channel 1. In such an arrangement, the total effective conductor thickness, taken at right angles to the direction of the magnetic flux lines, is reduced by about one-half as compared with a conductor having a square or rectangular cross section. As a result, this configuration causes the eddy current losses to be reduced to one-fourth of that occurring in a conductor having a square or rectangular cross section.

A similar result is obtained by constructing a conductor to have the form of the embodiment shown in FIGURE 8. The conductor 86 shown therein has particularly desirable structural characteristics for several applications. It should be particularly noted that in this embodiment the central sub-conductor 16 has a greater thickness than the remaining sub-conductors 10'', the purpose of this arrangement being to improve the ability of the conductor 86 to conduct electrical currents.

In the manufacture of the side conductors according to the present invention, particularly those shown in FIGURES 6 and 8, it is highly advantageous to use a copper foil which has been previously provided with an insulating layer and to glue adjacent foil thicknesses together during the winding operation. In order to facilitate the construction of a conductor having laminations of different thicknesses, such as is the case for the embodiment of FIGURE 8, it is preferable to utilize a foil which has been originally fabricated in such a manner as to have regions of different thickness. This greatly facilitates the manufacture of side conductors according to the present invention.

It will be understood that the above description of the present invention is susceptible to various modifications, changes, and adaptations, and the same are intended to be comprehended within the meaning and range of equivalents of the appended claims.

What is claimed is:

1. In a MGD or MHD generator having a flow channel through which an electrically conductive fluid medium flows, and a stator composed of two stator members each disposed along a respective one of two opposite sides of the flow channel and each provided with transverse grooves for receiving a multiphase stator winding which produces a travelling magnetic field which travels in the direction of the length of the channel and whose flux lines extend between the stator member in a direction substantially transverse to the length of the channel, the improvement comprising at least one side conductor disposed between said stator members and formed of a plurality of individual laminations which constitute sub-conductors and which are electrically insulated from one another, said sub-conductors being formed so that the lateral edges of each are in electrical contact with the medium and so that each extends in the direction of the length of the flow channel for causing said sub-conductors to form substantially short-circuit return paths for electric currents which flow through the medium transversely to the direction of fluid flow, said sub-conductors also being formed to extend substantially along the flux lines extending between said stator members and passing through said side conductor.

2. An arrangement as defined in claim 1 wherein all of said sub-conductors have substantially the same length transverse to the direction of fluid flow.

3. An arrangement as defined in claim 1 further comprising means defining a flow channel for the flow of such conductive medium, wherein said side conductor defines at least one lateral wall of said channel.

4. An arrangement as defined in claim 3 wherein said means defining a flow channel comprises at least one laminated stator having excitation winding grooves formed in one surface thereof, which surface defines another lateral wall of the flow channel.

5. For use in a MGD or MHD generator having a flow channel for the flow of a conductive fluid medium and at least one laminated stator provided with a stator winding, conductor means comprising at least one side conductor for providing a return path for electric current flowing through such fluid medium transversely to the direction of fluid flow, said conductor being formed of a plurality of individual laminations which constitute sub-conductors and which are electrically insulated from one another, each of said sub-conductors being constituted by two parts which are separated from one another along a plane of symmetry of said side conductor, which plane extends parallel to the direction of fluid flow and perpendicular to the direction of flux flow of the magnetic field produced by the stator winding.

6. An arrangement as defined in claim 5 wherein said two parts of each of said sub-conductors are symmetrical with respect to each other.

7. An arrangement as defined in claim 5 further comprising an insulating layer disposed between said two parts of each of said sub-conductors.

8. For use in a MGD or MHD generator having a flow channel for the flow of a conductive fluid medium and at least one laminated stator provided with a stator winding, conductor means comprising at least one side conductor for providing a return path for electric current flowing through such fluid medium transversely to the direction of fluid flow, said conductor being formed of a plurality of individual laminations which constitute sub-conductors and which are electrically insulated from one another, the surface of said side conductor which is to be in contact with such fluid medium having two beveled portions which are symmetrically disposed with respect to the center line of said surface in the direction of fluid flow for giving all of said sub-conductors substantially the same length transverse to the direction of fluid flow.

9. A method for manufacturing a side conductor for use in a MGD or MHD generator, which method comprises the steps of winding a foil of conductive material to form a coil; and separating the coil into at least two portions each defining a side conductor, whose individual foil layers define sub-conductors.

10. A method as defined in claim 9 comprising the further step of gluing adjacent turns of foil together during said winding step.

11. A method as defined in claim 9 wherein said winding is carried out to form a coil having a rectangular cross section.

12. A method as defined in claim 9 comprising the further step of dividing the coil into two side conductors by removing two triangular portions from the coil for causing all of the foil layers of each side conductor to have substantially the same length.

13. A method as defined in claim 9 wherein the foil is made of copper and is preliminarily provided with an insulating layer.

14. A method as defined in claim 9 wherein the foil has a varying thickness.

15. A method as defined in claim 14 wherein said step of winding is carried out by winding the thickest portion of the foil first.

16. A method as defined in claim 9 wherein said step of separating is carried out for dividing said coil into two symmetrical side conductors.

References Cited

UNITED STATES PATENTS

| | | | |
|---|---|---|---|
| 2,538,873 | 1/1951 | Jonker et al. | 29—25.17 |
| 2,865,291 | 12/1958 | Watt | 310—11 X |
| 3,008,418 | 11/1961 | Blake | 310—1 X |

DAVID X. SLINEY, *Primary Examiner.*

U.S. Cl. X.R.

29—25.17; 313—355